United States Patent [19]
Rosenthal

[11] Patent Number: 6,010,727
[45] Date of Patent: Jan. 4, 2000

[54] ACTINIC PROCESS FOR COLD PASTEURIZATION OF FRESH FOODS AND BEVERAGES

[76] Inventor: Richard A. Rosenthal, 2680 Pacer La., San Jose, Calif. 95111

[21] Appl. No.: 09/002,067

[22] Filed: Dec. 31, 1997

[51] Int. Cl.$^7$ .................................. A23B 7/00; A23L 3/00
[52] U.S. Cl. ........................... 426/240; 426/241; 426/248
[58] Field of Search ...................................... 426/235, 240, 426/241, 248; 99/451

[56] References Cited

U.S. PATENT DOCUMENTS

| | | | |
|---|---|---|---|
| 5,405,631 | 4/1995 | Rosenthal | 426/235 |
| 5,744,094 | 4/1998 | Castberg et al. | 422/24 |

*Primary Examiner*—George C. Yeung
*Attorney, Agent, or Firm*—Walter A. Hackler

[57] ABSTRACT

A process is provided for sanitizing fresh foods and beverage products using multiple stages of exposure to different wavelengths of ultraviolet, near infrared and infrared light. A food or beverage product is exposed to ultraviolet light at germicidal wavelengths in order to inactivate undesirable microorganisms on the product. The exposure to ultraviolet light causes damage to the organoleptic qualities product which are subsequently restored by photoreactivation upon exposure of the product to a source of polychromatic near infrared light. In addition, prior to the inactivation of microorganisms, the food or beverage may be exposed to a source of infrared light in order to inactivate enzymes responsible for decomposition of the product. Apparatus suitable for practicing the process of the present invention is also provided, including specific platform arrangements for sanitizing solid, liquid and fluid food and beverage products.

22 Claims, 4 Drawing Sheets

ACTINIC PROCESS FOR COLD PASTEURIZATION OF FRESH FOODS AND BEVERAGES

The present invention generally relates to a process for sanitizing fresh foods and beverages, and more specifically relates to a process for sanitizing fresh food and beverage products using multiple stages of exposure to different wavelengths of ultraviolet and infrared light in order to eliminate undesirable microorganisms without altering the nutritional or organoleptic qualities of the product.

Thermal processing of food and beverage products so that they will be safe for consumption, is used in a variety of forms. For example, as is well known, foods are commonly sterilized and preserved by commercial canning processes in which a food is placed in hermetically sealed container and then heat processed. For foods that are sold fresh rather than canned, thermal pasteurization may be used as a means of partially sterilizing the food substance by heating the substance to a temperature that destroys microorganisms without causing major chemical alteration of the food. Unfortunately, heat processing of food, in order to be effective in destroying objectionable microorganisms, is performed at temperatures which are severe enough to alter the structure of proteins and enzymes in the food, particularly when used to treat fresh fruits, vegetables and the juices thereof. This is a primary reason why thermally processed food products, such as for example, orange juice packaged in cartons and canned tomatoes, have a distinctly different taste than their fresh food counterparts.

Other sterilization methods utilized have included so called "cold pasteurization" techniques using high frequency radiation. Treatment with high frequency radiation is considered "cold pasteurization" because it theoretically will not cause significant heating of the food being treated. The use of gamma radiation has been studied and has been put to use in some countries as a means of sterilizing spices, tobacco, and animal feeds. However, low doses of gamma radiation are known to only partially inactivate pathogenic organisms. It is unfortunate that the required dosage of gamma radiation necessary to kill pathogenic organisms has been found to cause substantial damage to the food product in terms of visual appearance, taste, smell and texture, i.e. the organoleptic qualities of the food product. Furthermore, a number of persons believe that foods treated with high frequency gamma radiation is not safe for consumption, although the belief may be unsubstantiated. However, this has led to governmental restrictions on the use of gamma radiation treatment of food products intended for human consumption, as well as a degree of mistrust of such products by a substantial portion of the public. Obviously then, gamma radiation treatment of food products is currently not a feasible alternative to conventional heat pasteurization.

Irradiation processing using the actinic effects of ultraviolet light has been studied as a possible tool for sterilizing food products by exposing food products, such as bakery items and meat, to ultraviolet light at germicidal wavelengths, typically being wavelengths shorter than 300 nanometers. The most recent developments of irradiation processing have been only partially successful, at least in destroying microorganisms and parasites on the food. However, like thermal processing, irradiation treatment naturally activates enzymes, for example, lipoxygenase, in the food being treated. Undesirable superficial effects attributable to the activation of enzymes by irradiation includes the destruction of chlorophyl and carotenoids, development of oxidative flavors and aromas, which are often exhibited as burnt hay-like flavors and aromas and a chalk-like taste. Other undesirable effects include damage to vitamins and proteins and oxidation of essential fatty acids. Texture of the product is also influenced by oxidative effects, which may be exhibited as a bleached or roughened surface of the product.

Not surprisingly, attempts have been made to develop apparatus and methods for utilizing the germicidal effect of ultraviolet light while minimizing the damaging effects of such treatments. For example, U.S. Pat. No. 5,034,235 to Dunn et al, which is incorporated herein by this specific reference thereto, discloses the application of pulsed, incoherent, polychromatic light in the visible, near ultraviolet and far ultraviolet wavebands to food products. The Dunn patent describes the use of pulsed light, rather than a continuous light as a means for causing thermal and/or photochemical deactivation of microorganisms without substantially altering the organoleptic qualities of a food product. It is suggested that by pulsing the light, the heating effect of the light is concentrated to only a thin, superficial layer of the food product. Dunn also suggests that by use of appropriate filters, certain wavelengths which may be responsible for causing adverse effects on food quality, could be minimized during the pulsed light treatment, thus allowing only beneficial light to contact the food product surface.

Although the Dunn patent has identified the well known problems encountered through the use of ultraviolet radiation as a means for sanitizing foods, unfortunately, the suggested solution which focuses on utilizing pulsed rather than continuous light to control the adverse effects of the radiation, appears to be less than satisfactory.

Thus, although conventional food preservation and sterilization techniques may be effective in destroying or inhibiting the growth of microorganisms in the food, there is still a need for an acceptable cold irradiation method which will sterilize fresh foods and beverages while preserving the flavor, color, texture and aroma thereof.

The present invention provides a unique method and apparatus for sanitizing food products by selected sequential exposure to ultraviolet light for inactivating microorganisms in conjunction with UVB light for the extinction of reactive oxygen species (ROS) specifically for example ozone, and near infrared light in order to restore organoleptic integrity of the food product which may have been lost during the ultraviolet radiation treatment.

SUMMARY OF THE INVENTION

Accordingly, the present invention provides an actinic process and apparatus for cold pasteurization of foods and beverages. Generally a process in accordance with the present invention comprises the steps of sanitizing a food product by inactivating undesirable microorganisms on a surface and subsurface of the food product, and subsequently restoring organoleptic integrity of the food product by radiating near infrared light onto the sanitized food product. Although the step of sanitizing the food product preferably includes radiating the food product with ultraviolet light at germicidal wavelengths, it should be appreciated that the step may comprise other ways of sterilizing the food product using radiation.

The process of the present invention may also include the step of inactivating enzymes in the food product which are responsible for food decomposition. Preferably, the step of inactivating enzymes includes exposing the food product to near infrared light. This step may sometimes be hereinafter referred to as "photoregulation".

The step of restoring organoleptic integrity of the food product may sometimes be hereinafter referred to as "photoreactivation" for reasons which will be described in detail hereinafter.

More particularly, the process utilizes selected wavebands of ultraviolet light to inactivate a pathogenic organism by inducing photochemical changes in the organism which render it unable to duplicate or transport and metabolize nutrients essential for its survival. The wavelength of ultraviolet light which is most effective for inactivating microorganisms is less then about 310 nm and more particularly between about 220 nm and about 310 nm. In addition, the present invention may include radiating the product with UVB light between about 295 nm and about 300 nm, or more particularly at about 298 nm for extinction of reactive oxygen species, particularly ozone.

Although sanitized, the ultraviolet irradiated food product suffers an altered taste, smell and texture. Surprisingly however, the subsequent radiation treatment using near infrared light, i.e the photoreactivation step, restores the organoleptic integrity of the food product without compromising microbial inactivation. Preferably, the step of photoreactivation, comprises exposing the ultraviolet irradiated food product with near infrared light having wavelengths between about 350 nm to about 380 nm in the UVA waveband, about 450 nm in the Soret waveband, about 550 in the visible waveband and between about 660 nm and about 720 nm in the near infrared waveband.

The present invention may additionally include the step of disposing a protective material on the food product prior to irradiating the food with ultraviolet light in order to maintain the sterility of the food product throughout treatment, shipping and handling. The protective material may be a polymerizable solution. The food product may be immersed in the polymerizable solution such that when the product is exposed to the ultraviolet light the material changes into a film which covers the entire food product.

BRIEF DESCRIPTION OF THE DRAWINGS

The present invention will be more clearly understood with reference to the following detailed description when considered in conjunction with the appended drawings in which.

DETAILED DESCRIPTION

Figure 1:
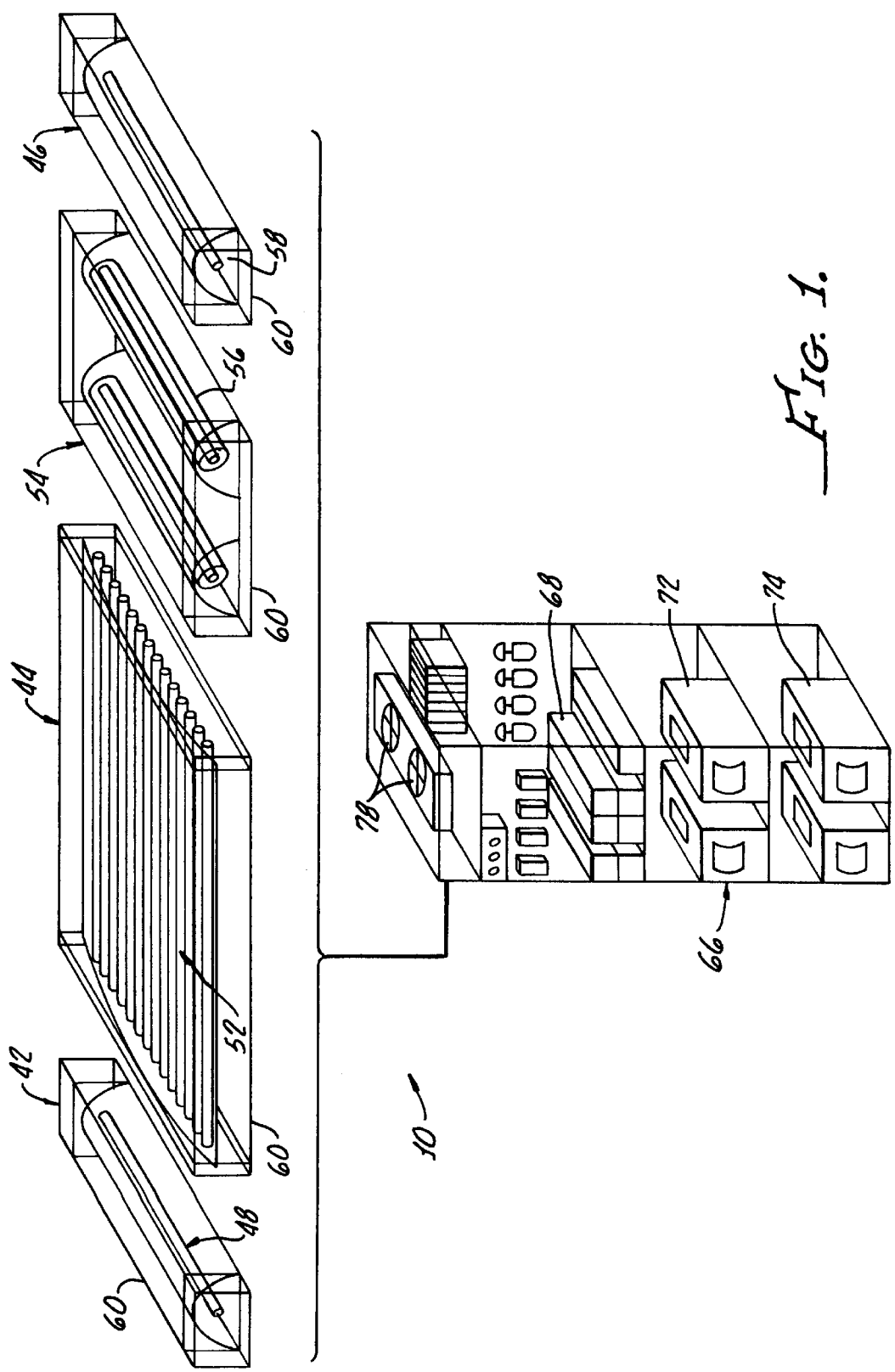
FIG. 1 shows a solid exposure platform for sanitizing fresh foods, particularly fresh solid foods such as whole fruits, meats and vegetables, in accordance with the present invention.

A process or method in accordance with the present invention generally comprises the steps of sanitizing a food product, such as fresh fruits, vegetables, juices, and meats for example, by radiating ultraviolet light at germicidal wavelengths into the food product and subsequently restoring organoleptic integrity to the food product by exposing the ultraviolet irradiated food product to visible and near infrared light.

In addition, the present invention may include an initial step of inactivating enzymes responsible for decomposition of the food product by exposing the food product to near infrared light. This step of inactivating enzymes is preferably performed prior to the ultraviolet irradiation step and may sometimes be hereinafter referred to as "photoregulation".

It is known that high intensity ultraviolet radiation may be used for sterilization by abating growth of undesirable microorganisms such as viruses, bacteria, spores, yeasts, molds and protozoa. However, when used for sanitizing food products such as fresh fruits or juices, the ultraviolet radiation causes damage to organoleptic qualities of the food. Such damage may be manifested by a burnt, hay-like taste and pungent aroma, as well as a chalky texture in the ultraviolet irradiated food. As will be discussed in detail hereinafter, these effects are reversible by subsequent irradiation of the sanitized food product with polychromatic light, particularly UVA visible and near infrared radiation, at selected wavelengths.

A general familiarity of the interaction of light with molecules in a living microorganism is necessary to an understanding of the present invention. The energy absorbed by a molecule radiated with ultraviolet radiation corresponds to the amount of energy necessary to excite electrons from the highest occupied molecular orbital (ground state) of lowest energy to the lowest occupied molecular orbital (excited state) of highest energy. Light absorbing molecules in a microorganism, called chromophores, absorb photons of ultraviolet radiation after transferring their electromagnetic energy to the chemical energy of the molecule in the excited state.

These chromophores are subsequently converted to photoproducts by two major photochemical reactions known as "photoaddition" and "photoisomerization" which will now be briefly discussed in turn. The reaction of an excited state molecule to form a covalently linked photoproduct is sometime referred to as a "photoaddition reaction" and correspondingly, the products of such reaction are referred to as "photoadducts". Photoadducts include cyclobutane thymine dimers and pyrimidine (6-4) pyrimidone dimers. A reaction sometimes referred to as a "photoisomerization reaction" occurs in molecules containing at least one carbon-carbon double bond ("C=C") that is not a ring structure. The prefixes "cis" and "trans" designate two arrangements of substituents that are attached to the C=C double bond and the two structures may be referred to as "cis-isomers" and "trans-isomers" respectively. Photoisomerization occurs when one of these isomers is converted to the other.

During ultraviolet radiation treatment, these two photochemical reactions disrupt the basic structural integrity of a microorganism by a tertiary, i.e. three-dimensional, structural rearrangement of the microorganism's proteins and enzymes. This disruption renders the microorganism unable to replicate itself or transport and metabolize nutrients essential for survival.

More specifically, ultraviolet radiation at germicidal wavelengths effects a microorganism on a molecular level in the following way. The tertiary structure of proteins and enzymes are delicately held together by weak intermolecular attractions. When proteins and enzymes undergo cold pasteurization by ultraviolet radiation this disrupts their spacial structures from well defined twisted spherical configurations for globular proteins such as enzymes, and interwoven parallel strands of amino acids linked by various side-chains that comprise the fibrous proteins such as collagen, to unfold from their well defined configurations to randomly looped chains. This process is called "denaturation".

In addition, ultraviolet radiation at germicidal wavelengths disrupts genetic material, deoxyribonucleic acid, or "DNA", of a microorganism by inducing the formation of pyrimidine dimers that obstruct further replication of the cell. More particularly, ultraviolet radiation is believed to cause pyrimidine bases in adjacent nucleotide of DNA strands to become covalently cross linked through the formation of cyclobutane dimers and pyrimidine (6-4) pyrimidone dimers which are reversibly transformed via photolysis into Dewar isomers. These photoadducts cause structural distortions of the DNA helix presenting a physical impediment to DNA replication and transcription. Cyclobutane thymine dimers are the most lethal photoadducts in the ultraviolet irradiated DNA while (6-4) pyrimidone dimers are the stronger mutagenic photoadducts. This induced "dimer-ization" of thymine monomers results in severe mutagenesis and deterioration of the DNA by distortion of the DNA helix in such a manner that polymerization past these cross-linked sites is blocked.

The ability of an organism to survive cellular destruction is directly related to the ability of the organism to remove the hereinabove described photoadducts from the DNA in the cells of the organism. Photoreactivation, or photorepair, of UV induced DNA damage is a vital cell function ubiquitously present in the plant and animal kingdoms.

The present invention utilizes this concept of photoreactivation to restore organoleptic integrity to food products which have been sanitized using ultraviolet light. More particularly, the present invention may include the steps of exposing a food product to ultraviolet light at germicidal wavelengths of between about 220 nm to about 310 nm for microbial inactivation, in conjunction with exposure to UVB light at between about 295 to about 300 nm, or more particularly at about 298 nm, for the extinction of reactive oxygen species, particularly for ozone. Organoleptic integrity of the UV damaged food product is restored by exposure of the product to polychromatic near infrared light, preferably having wavelengths from about 350 to about 380 nm in the UVA waveband, about 450 in the Soret waveband, about 550 nm in the visible waveband, and near infrared light having wavelengths of about 660 nm and about 720 nm in the near infrared waveband. It has been found that near infrared radiation treatment of sanitized, but UV damaged, food products results in repairing cell damage in the food product without compromising microbial reduction, i.e. without reversing the damaging effects of the ultraviolet light on undesirable microorganisms on the surface and subsurface of the food product.

It is believed that the formation of thymine dimers occurs at an absorption maximum of 254 nm. Formation of the (6-4) photoproducts occurs at 310 nm. It is also believed that high intensity ultraviolet radiation will break six chemical bonds for every 10 million bonds present. Ultraviolet radiation at 254 nm produces strand breaks less frequently as compared to a rate of formation of pyrimidone dimers. At longer wavelengths, the frequency of strand breaks increases to where at 365 nm the ratio of dimer formation to strand breaks is one to one (1:1). At wavelengths between about 365 nm to about 500 nm this ratio decreases.

Intracellular chromophores such as porphyrines, riboflavins and FADH2 (flavin adenine nicontinamide dinucleotide hydride) are all capable of absorbing actinic radiation which initiates photoreactivation, to be explained hereinafter, via energy transfer into the DNA.

The process of the present invention is optimized for maximum effectiveness at about 220 nm to about 310 nm in the ultraviolet waveband, or more particularly, at a peak wavelength of about 254 nm, for microbial reduction, while longer wavelengths in the infrared and near infrared wavebands are utilized for photoregulation and photoreactivation, respectively.

Preferably, prior to ultraviolet radiation treatment of the food product, i.e. prior to the sanitization step, the food product is first treated with infrared radiation in order to inactivate enzymes responsible for decomposition of the food product.

Phytochromes in the cells of an organism play a major role in obtaining information from the radiation environment. Phytochrome is a photoreversible pigment (chromophore) which exists in two main forms. The first main form is called Pr which is the inactive fraction which absorbs maximally at 380 nm in the UVA waveband and 660 nm in the red waveband. The second main form is called Pfr, which is the active fraction and which absorbs maximally at 400 nm in the Soret waveband and 720 nm in the near infrared waveband. Of critical interest is an additional absorption peak at 280 nm in the UVC waveband. The relative proportions of Pr and Pfr are established by the quality of the radiation environment.

The ultraviolet sanitation or purification step utilizes the actinic radiation wavebands of ultraviolet light from about 220 nm to about 310 nm, and a peak wavelength of about 254 nm, to inactivate pathogenic microorganisms by the absorption of photons in the molecules of the microorganism.

While not wishing to be bound by theory, it is believed that ultraviolet radiation at germicidal wavelengths favors the survival of eukaryotic plants cells while unfavorably discriminating against the survival of prokaryotic and eukaryotic animal cells. It is believed that the mutagenic/cytotoxic defects introduced into the DNA of these cells is massive and overwhelming. Furthermore, the photoreactivation mechanism described hereinabove does not repair the these types of cells but only serves to further their continued destruction by causing energy transfer of UVA, visible, and near infrared radiation into the cells' severely mutated DNA eliminating the possibility of further replication. Thus, in summary, the photoreactivation mechanism utilizing near infrared light at selected wavelengths, functions to repair UV damaged cells of food products such as fruits, vegetables and juices, while causing further damage to undesirable microorganisms such as bacteria or yeasts on the surface and subsurface of the food product.

Mutagenic and cytotoxic destruction of pathogenic microorganisms is selectively favored without compromising the benefits of photoreactivation given the following considerations:

Viruses are noncellular intracellular parasites consisting of one molecule of nucleic acid (DNA/RNA) wrapped in a protein envelope (1 nm thick), with a diameter of 30 nm–90 nm.

Prokaryotes (bacteria) are unicellular. The cell is not compartmentalized and lacks nuclei. DNA is thus not protected by a membrane, therefor the DNA and ribosomes freely exist within the cytoplasm of the bacteria. The DNA and ribosomes are contained within a plasma membrane surrounded by a thin cell wall contained within a capsule (35 nm average thickness) having a diameter of 1,000 nm to 10,000 nm.

Eukaryotes (protozoa/animal cells) are multicellular. The DNA, combined with portions, is contained within a nucleus and protected by two nuclear membranes. The cell is highly compartmentalized containing the nucleus, ribosomes, mitochondrion, and lysosomes all contained within a plasma membrane (30 nm average thickness) with a diameter of 10,000 nm to 100,000 nm.

Eukaryotes (plant cells) are multicellular. The DNA combined with portions is contained within a nucleus and is protected by a nuclear envelope and is surrounded by a rough and a smooth endoplasmic reticulum. The cell is highly compartmentalized containing the nucleus, ribosomes, mitochondrion, a vacuole surrounded by a vacuolar membrane (tonoplast) and chloroplasts (carotenoids and chlorophylls). They are all contained within a plasma membrane and protected by a rigid, thick cellular wall (200 nm average thickness) with a diameter of 10,000 nm to 100,000 nm.

It is important to understand that carotenoids found in the chloroplasts of eukaryotic plant cells serve a protective function in the cell by preventing damage to the photosynthetic mechanisms within the cell caused by photodynamic sensitization. This occurs when excited triplet chlorophyll acts on (ground state) triplet oxygen, forming potentially lethal (excited state) singlet oxygen during irradiation. Carotenoids protect the chloroplast lamellar system, specifically the 70S ribosomes, by a triplet-triplet exchange reaction which returns chlorophyl to its ground state while the excited carotenoid molecules dissipate the extra energy by a radiationless process as heat. It is also significant that prokaryotic cells are usually "haploid", i.e. containing one set of genetic instructions for cellular replication, while eukaryotic cells are always diploid or polyploid, i.e. containing two or more sets of genetic instructions for cellular replication.

Denaturation. The tertiary structure of proteins and enzymes are delicately held together by weak intermolecular attractions. When proteins and enzymes undergo cold pasteurization by ultraviolet radiation this disrupts their spacial structures from well defined twisted spherical configurations for globular proteins such as enzymes, and interwoven parallel strands of amino acids linked by various side-chains that comprise the fibrous proteins such as collagen, to unfold from their well defined configurations to randomly looped chains; this process is called "denaturation".

On a molecular level, when a food or beverage product is irradiated with ultraviolet light at ambient temperature from about 5 degrees Centigrade to about 40 degrees Centigrade, at a pH of 3.0 to 4.7, at a nominal ultraviolet radiation dosage of 1500 $mJ/cm^2$, the hereinabove described "denaturation" effect changes the biophysical properties of proteins in the food product, including a decrease in solubility of the globular proteins. In addition, most enzymes experience a diminished threshold of their catalytic activity. This may be attributable to the unfolding of their tertiary structures which deprives the enzymes of the reaction sites necessary for catalytic activity. Consequently, as a result of denaturation, globular proteins are more readily attached by proteolytic enzymes whose polar-covalent bonds have been split and subsequently hydrolyzed.

Importantly, these effects of ultraviolet radiation are of a temporary and reversible nature when the food product is subsequently exposed to radiation near the infrared side of the visible spectrum, particularly polychromatic near infrared radiation.

Enzymatic browning occurs in may fruits, vegetables and juice products when the product tissues are exposed to air. This happens when the plastid membrane that protects the cells photosensitive mechanisms (plastids, i.e flavenoids/anthocyanins/chlorophylls/carotenoids) rupture conjunctively with the vacuolar membrane and the contents are intermixed. This normally occurs during ageing (senescence) of the product, or when the integrity of the cell is compromised which results in the catalysis of phenols released from within the vacuolar membrane.

Polyphenol oxidase catalyzes two types of reactions, i.e. the "cresolase" activity in which monophenols are hydroxylated to o-diphenolase, and the reaction pathway of polyphenol oxidase acting in concert with oxygen "polyphenol oxidase" activity which is a diphenolase type of reaction. A substrate for these reactions is catechol, an o-diphenol.

Polyphenol oxidase catalyzes two types of reactions, i.e. the "cresolase" activity in which monophenols are hydroxylated to o-diphenolase, and the reaction pathway of polyphenol oxidase acting in concert with oxygen "polyphenol oxidase" activity which is a diphenolase type of reaction. A substrate of these reactions is catechol, an o-diphenol.

Polyphenol oxidase is classified as an oxidoreductase widely distributed in higher plants, fungal and animal tissues. It is a copper containing enzyme with oxygen functioning as the hydrogen acceptor.

Browning results from the conversion of phenolic compounds to brown melanins via the reaction pathway of polyphenol oxidase. Monophenol monooxygenase (tyrosinase) the first enzyme initiates the browning reaction which subsequently invokes the second enzyme, polyphenol oxidase.

A proposed model for the site of interaction with the phenolic substrate (mono/o-diphenol) is based on the binuclear center of copper. The basic functional molecular unit for he enzyme is a single chain protein with two copper atoms per molecule, liganded in part by histidine. The active site of copper is presumed to be binuclear and occurs in different functional states,: met, oxy and deoxy. One of the $Cu2+$ atoms is bound to the monophenols while diphenols bind to both copper atoms. Monophenolase activity is intimately coupled to diphenolase (cresolase) activity and produces two electrons of which are required to incorporate one oxygen atom into the monophenol substrate (first reaction). The product of this reaction is subsequently oxidized by the polyphenol oxidase reaction (activity) to form o-quinone phenylalanine (second reaction) of which is followed by the formation of a red compound, dopachrome (5,6-quinone indole-2 carboxylic acid) which contains a heterocyclic ring derived from the closure of the aminocarboxylic acid side chain (third reaction). Dopachrome then undergoes polymerization to form brown melanins (fourth reaction).

Summarizing these reactions, the first reaction is thought to be a secondary hydroxylation of o-quinone of excess o-diphenol. In the second reaction, the resultant compound (triphenolic trihydroxybenzene) interacts with o-quinone to form hydroxyquinones. In the third reaction, the hydroxyquinones undergo polymerization and are converted to red-brown polymers. In the fourth reaction, the red-brown polymers are converted to melanins. Of critical importance is the fact that quinone formation is both enzyme and oxygen dependent. Once this reaction has occurred subsequent reactions proceed spontaneously without the presence of polyphenol oxidase or oxygen.

The redox properties of quinones are critical to the functioning of plant cells where ubiquinones are the biochemical oxidizing agents for mediation of the electron-transfer process involved in energy production (photophosphorylation). In the photophosphorylation process, ubiquinones function within the mitochondria of cells as mobile electron carriers (oxidizing agents) to mediate the respiration process, the conversion of glucose $C_6H_{12}O_6 + 6O_2 \rightarrow 6CO_2 + 6H_2O +$ energy. In this process electrons are transported from a biological reducing agent FADH/NADH (flavin adenine nicotinamide dinucleotide hydride to molecular oxygen. The ultimate result of this process is a cycle whereby FADH/NADH is oxidized to FAD/NAD+, oxygen is reduced to water and energy is produced. In this role, ubiquinones are catalysts acting only as intermediaries and are themselves unchanged.

Of critical importance are those enzymes naturally found in eukaryotic (plant/animal) cells most responsible for the degradation of flavor volatiles during UV irradiation and the reaction mechanisms for their inactivation during photoregulation and their subsequent reversal after photoreactivation.

The major classes of enzymes that are impacted by the process of the present invention are as follows:

Oxidoreductases are enzymes that oxidize or reduce substrates by the involvement of oxygen(oxidation) of by transfer of hydrogens or electrons(reduction).

Hydrolases are enzymes in which water particulates in the breakage of covalent bonds of the substrates with concurrent addition of the elements of water to the principles of the broken bonds.

Isomerases are enzymes that bring about isomerization of the substrate. This is where there is a C=C double bond (other than a ring structure) where "cis" and "trans" isomers are attached to the double bonds and isomerization occurs when one of these isomers in converted to the other.

Lyases are enzymes that remove groups from their substrates (other than by hydrolysis) to leave a double bond, or may add other functional groups to the double bond it has created.

Of these classes, the oxidoreductases enzymes are the most important. It is believed that the dominant enzyme in this classification most responsible for the photoreversible chemical alterations of pigments, flavors and aromas and texture is believed to be lipoxygenase.

Lipoxygenase (linoleate:oxygen oxireductase) is widely distributed in plant cells and to a much lesser degree, animal cells. Lipoxygenases are members of the class of mononuclear nonheme iron enzymes that contain a single iron per protein, coordinated primarily by amino acid side chains. The iron initially in the ferrous state must be oxidized to the ferric state in order to for it to become active. This enzyme catalyzes the oxidation of lipids containing cis, cis-1,4-pentadiene groups to conjugated cis, trans-hydroperoxides in the presence of molecular oxygen. Substrates of lipoxygenase include lineolic, linolenic, arachidonic acids in both the free and estrified forms, excluding oleic acid. This enzyme functions as a pro-oxidant and initiates the oxidative rancidity of plant lipids containing a high proportion of polyunsaturated fatty acids.

Resultant from these reactions are the active formation of free oxygen centered radicals superoxide (O2), peroxyl (L—OO), hydroxyl (OH), perhydroxyl (HO2) and hydroperoxides (HOO—). Other reactive oxygen species resultant from these reactions that are non-radical derivatives of O2 are hydrogen peroxide (H2O2), ozone (O3) and hyperchlorous acid (HOCL).

Further non-enzymic reactions lead to the formation of aldehydes, including malondialdehyde, a reactive aldehyde.

Undesirable superficial effects attributable to the activation of lipoxygenase resultant from UVC irradiation without photoregulation would include destruction of chlorophyl and carotenoids, development of oxidative off-flavors and aromas, often characterized as burnt hay-like and pungent with meat and beverages exhibiting a chalky taste that accompanies the off-flavors and aromas; oxidative damage to vitamins and proteins; and oxidation of the essential fatty acids and lineoleic, linolenic and arachidonic acids. Texture may be influenced by oxidative effects from temporary formation of extremely reactive O2 free radicals which may bleach and roughen the exterior surfaces of food and beverage products.

At the onset of photoregulation the cells plastids are protectively darkened and Pfr initiates its regulation of the ionization potential of anticipated lethal radiation via the flavins of which protect the cells' ribosomes and the carotenoids which protect the chlorophylls and anthocyanins During UVC irradiation, lipoxygenases mononuclear "ferrous" iron is electronically excited to its oxidized "ferric" state of which results in the activation of the enzyme. A side-chain reaction during this process results in the formation of highly reactive oxygen species.

At the onset of photoreactivation the highly reactive oxygen species (ROS) may incorporate themselves into the formation of structures similar to crown ethers. This structure then inactivates the enzymes "ferric" iron by incorporating it into the interior if its cylindrical configuration.

Crown ethers are macrocyclic polyethers that contain repeating $(O—CH2.CH2)n$ units; 1,4,7,10,13,16-hexaoxacylooctadecane. Crown ethers are powerful phase-transfer catalysts that transfer ionic compounds into an organic phase either from H2O or more commonly from the solid crystal.

The primary concurrent mechanism for inactivation of lipoxygenase are the structural formations of cyclodextrins through the interaction of ROS. Cyclodextrins are comprised of 6,7,8 or more D-glucose units joined through 1,4-alpha linkages in such a way as to form a ring-a chain bracelet each link of which is a pyranose hexagon. These rings are doughnut-shaped and similar to crown ethers, but their diameter is twice as large (approximately 1 nm). Cyclodextrins are polysaccharides of low molecular weight belonging to the general class of oligosaccharides; their structural configuration is remarkably similar to a crown ether.

In contrast to a crown ether, a cyclodextrin has a polar, hydrophillic exterior and a relatively non-polar lipophillic interior. The significance of this is that the cyclodextrin incorporates a polar organic molecule, or the non-polar end of an organic molecule into its structure as opposed to an ion; and its hydrophilic exterior confers water solubility on the resulting complex.

Cyclodextrins catalyze organic reactions with regioselectivity, and a degree of stereoselectivity. The proposed effects of cyclodextrins on lipoxygenase are they can change the enzyme's conformation; the lipophilic ring can provide a non-polar medium for the enzyme within a polar solvent, and their OH(hydroxyl) groups can participate in the reaction as nucleophiles, or as hydrogen bonding sites.

The method of the present invention is useful for cold pasteurization of meat products as well as plant derived products.

Meat coloration is determined by the chemistry of myoglobin, its state of oxidation, type of ligand bound to the heme, and state of the globin protein. The heme iron within the polyphyrin ring may exist in two forms, either reduced ferrous (+2) or oxidized ferric (+3). This state of oxidation for the iron atom within heme is distinguished from the oxygenation of myoglobin. More particularly, when molecular oxygen binds to myoglobin, oxymyoglobin is formed. This process is referred to as oxygenation. When oxidation of myoglobin occurs, the iron atom is converted to the ferric state, forming metmyoglobin (Mmb). Heme iron in the +2 ferrous state which lacks a bound complex group from which electrons are donated (ligand) in the sixth position (N2) of the heme group, is called myoglobin.

Meat tissue that contains primarily myoglobin (deoxymyoglobin) is purplish red in color. Binding of molecular oxygen in the sixth ligand yields oxymyoglobin (MbO2) that changes meat tissue to bright red. When purple myoglobin and red oxymyoglobin oxidize, this changes the state of the iron from ferrous to ferric. If this change in state occurs through autoxidation, these pigments aquire the undesirable brownish-red coloration of metmyoglobin (Mmb). In this state, metmyoglobin is not capable of binding oxygen, and the sixth coordination position (ligand) is occupied by a water molecule.

Myoglobin is a globular protein consisting of a single polypeptide chain. The protein portion of the molecule is known as "globin" while the chromophore component responsible for light absorption and coloration is a porphyrin known as "heme". Within this porphyrin ring, a centrally located iron atom is complexed with four tetrapyrrole nitrogen atoms. Myoglobin is a complex of globin and heme. The heme porphyrin is present within a hydrophobic pocket of the globin protein and bound to a histidine residue. The centrally located iron atom possesses six coordination sites (ligand), four of which are occupied by the nitrogen atoms within the tetrapyrrole ring. The fifth coordination site is bound by the histidine residue of globin, leaving the sixth site available to complex with electronegative atoms donated by various ligands.

Freshly stored meat metmyoglobin is formed by two opposing reactions; autooxidation and reduction whereby metmyglobin is reduced to myoglobin, and myoglobin undergoes autooxidation to metmyoglobin. These reactions referred to as "metmyoglobin-reducing activity" (MRA), are responsible for the valence change in myoglobin from "ferrous" to "ferric" in meat tissues. The reduction of metmyoglobin and oxygen in meat is carried out via reduced nicotinamide adenine dinucleotide (NAD+). Succinic dehydrogenase appears to be a key enzyme that increases oxygen utilization. This enzymes remains potentially active in meat tissue and is capable of resuming activity in the presence of oxygen providing suitable hydrogen donors are still available such as nicotinamide adenine dinucleotide hydride (NADH+). The reduction of metmyglobin in postmortem meat is due mainly to enzymes in which the mitochondria act as a source of reducing equivalents for Succinic dehydrogenase, acleotides.

Succinic dehydrogenase, a flavoenzyme, is covalently attached to the sixth ligand of the iron heme within the porphyrin ring. This mediates increased oxygen utilizing favoring the reduction of metmyoglobin and oxygen to myoglobin. This enzyme has a dominant absorption spectra at 280 nm with major peaks at 380 nm and 460 nm.

The following example is presented to show the usefulness of the present invention. Unfiltered, unpasteurized apple juice was divided into two, equal volume samples and both samples were treated with equal exposure to UV radiation at germicidal wavelengths of 254 nm. A taste test was performed by an investigator from the U.S. Food and Drug Administration. The investigator was able to taste and smell the difference between the UV process juice and the UV processed juice which had been photorepaired by photoreactivation using near infrared light using a process in accordance with the present invention.

Tests have been performed on unfiltered and unpasteurized juices including apple, carrot, pineapple and tangerine. It has been concluded by these tests that when UV light alone is used to treat the juice, the product has an undesirable burnt taste and smell and poor appearance. When the product is photorepaired after the UV treatment, the juice is organoleptically restored to its original, pre-ultraviolet treated state, including its original color and pigmentation.

Numerous tests have been performed on various fruits, vegetables, meats and beverage products using this process. An average microbial reduction of three logs was attained with taste panels detecting no organoleptic differences between test and control groups of food and beverage products eighty five percent (85%) of the time. In contrast, taste panels were always able to detect the difference between UVC irradiated foods that were not photoreactivated and their respective control groups.

The present invention may additionally include the step of disposing a protective material on the food product prior to irradiating the food with ultraviolet light in order to maintain the sterility of the food product throughout treatment, shipping and handling. The protective material may be a solution that is polymerizable, such that it changes from a liquid to a transparent film upon exposure to ultraviolet light.

Preferably, for solid food products such as "peel" products, including whole fresh fruits and vegetables and other product types, the product is immersed in a bath containing polymerizable solution in liquid form. The polymerizable solution is preferably a poly-vinyl-alcohol (PVA)/water solution. The food is then retrieved from the bath and subsequently treated with infrared light during photoregulation, or ultraviolet light during inactivation of microorganisms as described above. The exposure to light will cause the solution to cross-link, or polymerize and the product is simultaneously irradiated through the film.

This method provides individual protection for solid food products from microbial contamination during further treatment, handling, and storage, while not effecting appearance of the product. The film is dissolvable and thus may be rinsed from the product with warm water. The respiration characteristics, thickness of the film and its solubility in water are determined by the ratio of PVA to water in the immersion bath.

Figure 2:
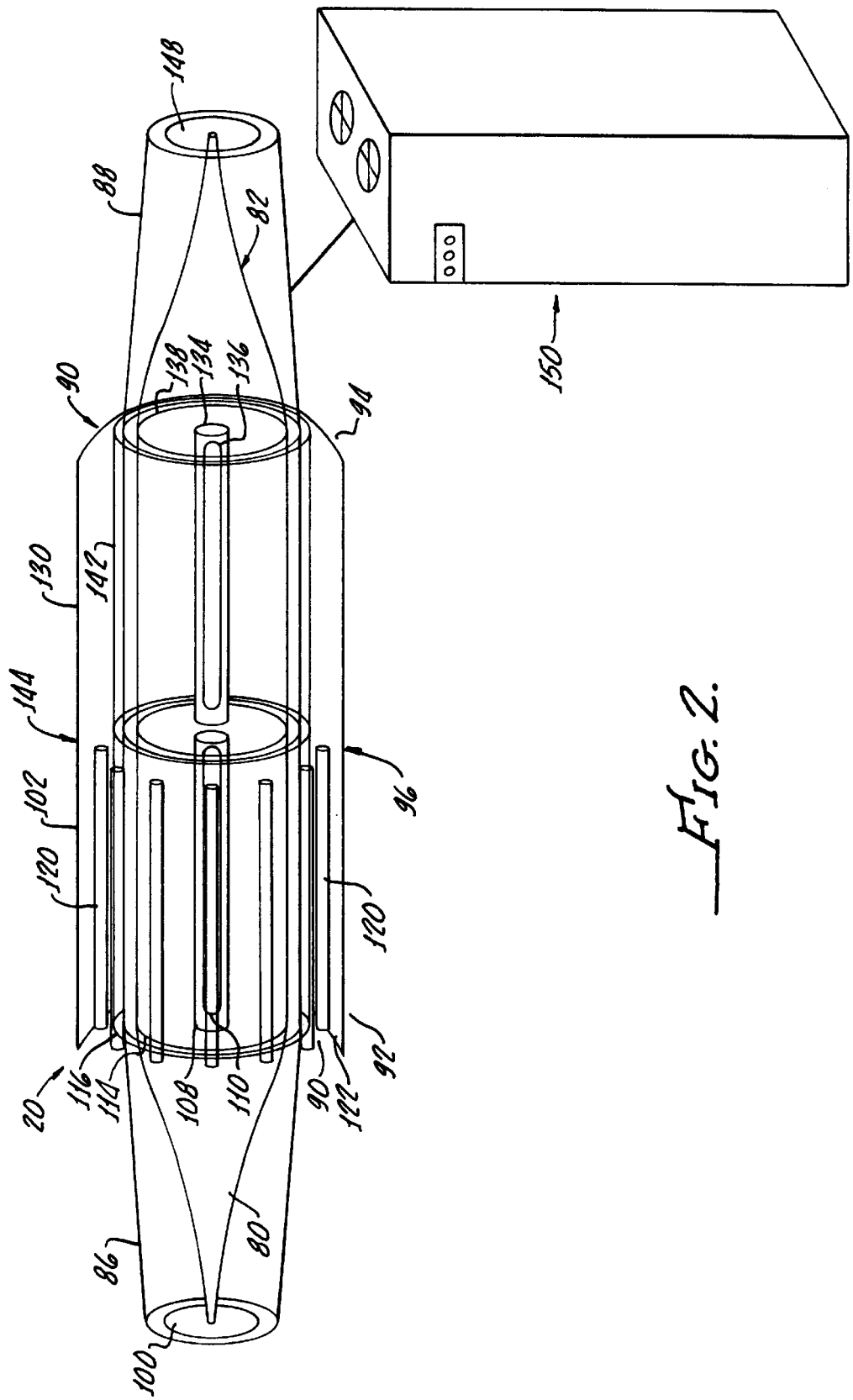
FIG. 2 shows a fluid exposure platform apparatus, in accordance with the invention, for sanitizing fresh foods in fluid form, such as sauces and ground beef.
Figure 3:
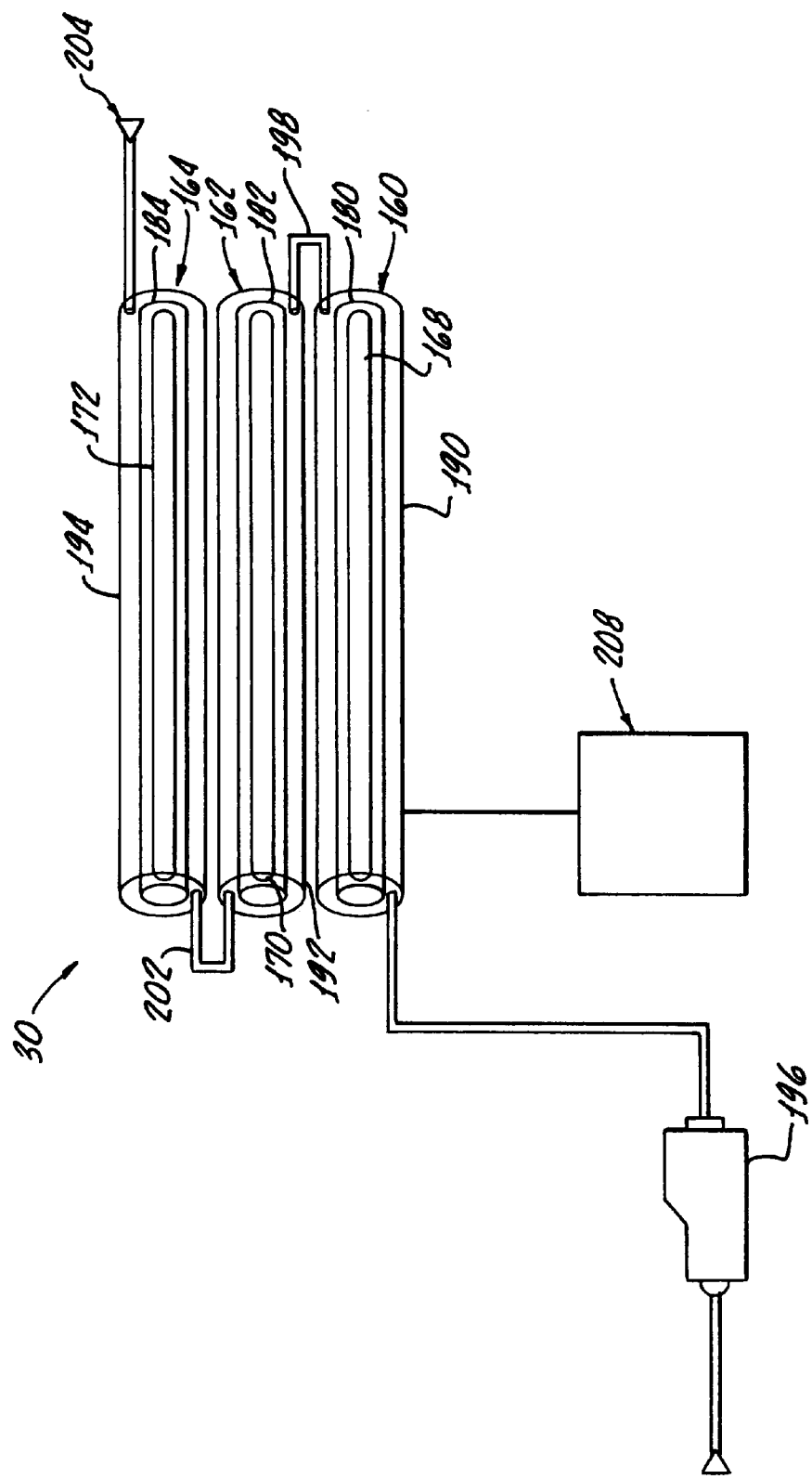
FIG. 3 shows a liquid exposure platform apparatus, in accordance with the invention, for sanitizing fresh beverages or foods in liquid form, such as fresh fruit juices.

Apparatus suitable for performing a method of the present invention will now be described. As shown in FIGS. 1, 2 and 3 respectively, there are three basic configurations of exposure platforms 10, 20, 30, each specifically configured for each category of food product type. These categories of food product type are "solid", "fluid" (viscous) and "liquid".

Typical food products by category are as follows. "Solid" food products include fresh cut fruits and vegetables, nutmeats, meats, stone fruits and berries. "Fluid" food products include ground hamburger and sausages, sauces, syrups and concentrates. "Liquid" food products include water, juices and beverages.

Turning now specifically to FIG. 1, the solid food product exposure platform 10 is used to irradiate an effective linear treatment area. The platform 10 is comprised of three distinct stages, a first stage 42 being suitable for photoregulation of the food product, a second stage 44 being suitable for inactivation of pathogenic microorganisms, and a third stage 46 being suitable for photoreactivation of the food product to restore organoleptic integrity thereto.

For example, the entire platform 10 may comprise an area which may be about two feet in width to about 8 feet in length, with the photoregulation stage 42, inactivation stage 44, and photoreactivation stage 46 being 2.0 feet by 1 foot, 2.0 feet by 4.0 feet and 2.0 feet by 1 foot in dimension respectively. Each stage 42, 44, 46, 47 may be mounted on an adjustable rail (not shown) as means for permitting different exposure intensities depending upon the type of food product.

As a particular example, the first stage 42, i.e. the photoregulation stage, contains preferably two high intensity, AC pulsed xenon air cooled lamps 48 or two high intensity discharge air cooled metal halide lamps. This photoregulation stage 42 is particularly important for the treatment of plant based food products.

The second stage 44, i.e. the inactivation stage, preferably contains up to fourteen or more very high intensity low pressure air cooled mercury vapor lamps 52. Optionally, the inactivation stage 44 may also contain an arrangement 54 of two ultra high intensity, medium pressure water cooled mercury vapor arc lamps 56, or any other suitable arrangement of lamps which can be utilized to effectively deactivate pathogenic microorganisms on the food product. This optional arrangement of lamps 54 may be about 2 feet by 2 feet in dimension.

The third stage 46 i.e. the photoreactivation stage, may contain the same arrangement of lamps as in the first, or photoregulation stage 42. In other words, the third stage 46 may contain either two high intensity AC pulsed xenon air cooled lamps or two high intensity discharge air cooled metal halide lamps 58.

Housings 60 made of stainless steel for example, may be provided for each of the three stages 42, 44, 46.

Means for conveying the food product through the three stages may include for example, flite feeders, dual rollers, vibratory or chain link conveyers (not shown) In addition, when using a flite feeder, quartz sleeves (not shown) may be added at the end of each flite to encase the low pressure mercury lamps 52 in order to provide 360 degrees of incident radiation.

To achieve "organized separation" for small and numerous food products such as nutmeats (almonds for example), a vibratory separation plate (not shown) vibrated on a vertical axis with cutouts for the food product to drop through is used to permit exposure on one side of the food product as the product is dropped onto a horizontal conveyer underneath the separation plate from a distance not greater than one-and-a-half times the products thickness. For increased volume multiple rows of cutouts may be used on the separation plate. The opposite side of the food product is irradiated when the product is transferred from a horizontal conveyer to a transfer curve (not shown) which uses a food product such as an almond to be rotated around a horizontal cylinder containing an exposure source in its interior, located inside of a precisely contoured hemispherical sheath located one and a half times the depth of the almond away from the exterior surface of the cylinder. This sheath runs the length of the cylinder and is the width of a conveyer, with one opening at the top of the cylinder accepting almonds from a horizontal input conveyer, and the other opening located at the exit at the bottom of the cylinder, depositing the rotated nuts onto a horizontal output conveyor.

Square rollers may be used as transport means to provide uniform irradiation for fresh cut pineapple, and non-symmetrical meat products, while round rollers may be employed for baby carrots, peas and grapes.

The maximum throughout for this particular example of the solid exposure platform 42 is 7.2K pounds per hour for fresh cut products. The system 42 weighs about 1500 pounds.

FIG. 1 also shows a control console 66 for operating the solid exposure platform 10. The control console 66 may include electronic ballasts 68 for regulating the low pressure mercury lamps 52 in the inactivation stage 44, and two sets of transformers 72, 74 for regulating the lamps 48, 58 in the photoregulation and photoreactivation stages 42, 46 and the optional medium pressure mercury vapor lamp 56 in the inactivation stage 54, respectively. One or more exhaust fans 78 may also be provided for cooling the console 66 during operation.

Turning now to FIG. 2, the fluid exposure platform 20 shown may be utilized for cold pasteurization of viscous "fluid" food products as discussed hereinabove. In the embodiment shown, an effective cylindrical treatment area of about 452 square inches may be irradiated. A specific example of the fluid exposure platform will now be described though it is to be appreciated that the invention is not to be limited thereby.

The system 20 preferably comprises two stainless steel invented cones 80, 82 each measuring 3.5 inches in diameter and 6 inches in length. The cones 80, 82 are encased in two separate sections of stainless steel pipe 86, 88 measuring 4 inches in diameter with flange mounts 90 or the like for attachment to each end 92, 94 of a tube in tube counter current heat exchanger 96 which will be described in detail hereinafter.

An inlet passage for the untreated fluid food product (not shown) is defined by a convergent conical section 100 formed between the first cone 80 and the stainless steel pipe 86 as shown.

An inactivation section 102 of the tube in tube counter current heat exchanger 96 is provided which generally comprises an inner quartz cylinder 108 that houses an ultra-high intensity medium pressure mercury arc lamp 110. This inner cylinder 108 measures 1.5 inches in diameter and 34 inches in length and is encased in a sealed outer quartz cylinder 114, which is filled with water or other cooling fluid and may hereinafter sometimes be referred to as the "water jacket", and which cools the medium pressure mercury arc lamp 110. The water jacket 114 may be about 3.5 inches in diameter and 34 inches in length.

Circumferentially surrounding the water jacket 114 is a quartz outer casement cylinder 116 measuring about four inches in diameter and 34 inches in length. The food product (not shown) is expanded by the first conical section 100 and then is reduced from a 3.5 inch cylindrical mass to a ¼ inch thick annular laminar film by being forced through the conical section 100 and between the water jacket 114 and the outer casement cylinder 116.

Surrounding the outer casement cylinder 116 are twelve super high intensity low pressure mercury arc lamps 120, all of which are protected by an eighth inch diameter by 34 inch length stainless steel NEMA ISO 9002 enclosure 122. The enclosure 122 may be include reflective interior surfaces to provide for maximum irradiation of the food product.

Next, after undergoing microbial inactivation in the inactivation section 102 of the tube in tube counter current heat exchanger 96, the laminar flow of the food product passes through a photoreactivation section 130 of the irradiation chamber 96. The photoreactivation section 130 comprises an inner quartz cylinder 134 that houses an ultrahigh intensity pulsed xenon or metal halide lamp 136. This inner quartz cylinder 134 measures 1.5 inches in diameter and 34 inches in length and is encased in a sealed outer quartz cylinder 138 which functions as a water jacket, similar to the water jacket 114 in the first section, which cools the pulsed xenon or metal halide lamp 136. This sealed outer quartz cylinder measures 3.5 inches in diameter and is 34 inches in length.

Circumferentially surrounding the outer quartz cylinder (water jacket) 138 is a quartz outer casement cylinder 142 measuring 4 inches in diameter and 34 inches in length. This outer casement cylinder 142 is protected by an eight inch diameter by 34 inch in length stainless steel NEMA ISO 9002 enclosure 144. This enclosure 144 is attached to the inactivation section 102 and the cylindrical pipe 88 with for example, flange mounting brackets (not shown).

After the photoreactivation treatment, the food product passes through a output passage defined by divergent conical section 148 between the second cone 82 and the surrounding pipe 88.

A control consol 150, connected to the tube in tube heat exchanger 96 may be provided for enabling control and regulation of the irradiation process as needed.

The throughput for this viscous fluid food treatment apparatus 20 as described hereinabove is determined by a user's pipe pressure, which may be, for example, between about 150 to about 200 pounds per square inch. The system 20 as described weighs about 150 pounds.

Turning now to FIG. 3, the liquid exposure platform 30 shown may be utilized for cold pasteurization of liquid food products. The liquid exposure platform 30 may be hereinafter referred to as the liquid exposure "module".

As a specific example, the liquid exposure module 30 shown will irradiate an effective linear treatment area of 1020 square inches. The module 30 shown generally comprises three inner quartz cylinders 160, 162, 164, also referred to as "immersion wells". Each immersion well 160, 162, 164 houses, respectively, a high intensity pulsed xenon or metal halide lamp 168, an ultra high intensity medium pressure mercury vapor arc lamp 170, and another pulsed xenon or metal halide lamp 172. Each immersion well 160, 162, 164 measures 1.5 inches in diameter and 34 inches in length and each is individually encased in an outer casement quartz cylinder 180, 182, 184 respectively, each measuring 2 inches in diameter and 34 inches in length. These outer casement cylinders 180, 182, 184 are encased in stainless steel NEMA ISO 9002 6 inch in diameter and 36 inch in length cylindrical enclosures 190, 192, 194 respectively.

The liquid food product (not shown) is introduced into the system 30 by an aseptic pump 196 where the product enters the first outer casement cylinder 180 for photoregulation. The product forms a ¼ inch thick laminar film between the immersion well 160 and the and the outer casement cylinder 180. Next, the product enters the second outer casement cylinder 182 though passage 198 for inactivation of microbial organisms in the product. After inactivation in the second outer casement cylinder 162, the product enters the third outer casement cylinder 184, by means of passage 202, for photoreactivation. The product exits the system 30 through the product output line 204.

The module 30 hereinabove described may treat up to 10 GPM or more of liquid product and weighs approximately 150 pounds. A control console 20, similar to the console 66 shown in FIG. 1, connected to the cylinders 160, 162, 164 may also be provided.

Figure 4:
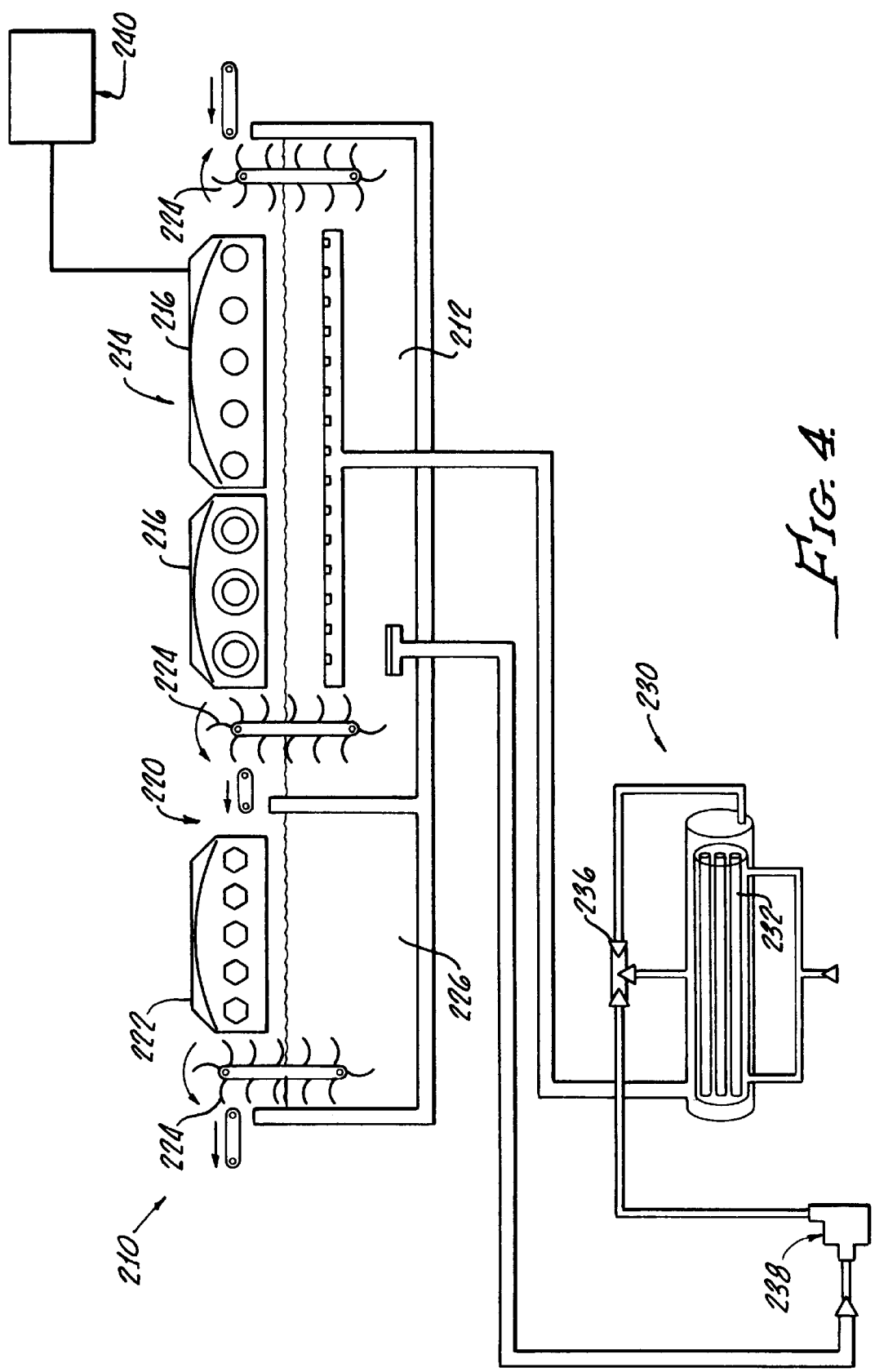
FIG. 4 shows a immersion exposure platform system, in accordance with the invention, for sanitizing foods that can be immersed, such as stone fruits and "peel" products.

FIG. 4 shows another embodiment of the present invention, more particularly, an immersion system 210 for cold pasteurization of "peel" products, stone fruits, and other food products that can be immersed in water during treatment. This embodiment 210 is similar to the solid food treatment platform 10 shown in FIG. 1, with the exception that the food product (not shown) is immersed in a recirculating, aqueous solution tank 212 while undergoing the inactivation treatment.

More particularly, the immersion system 210 may generally comprise a first, inactivation stage 214 which includes the immersion tank 212 mentioned hereinabove for immersing the product in an aqueous solution while the product is treated with an arrangement of lamps 216 suitable for inactivating microbial organisms on the food as described hereinabove.

A second stage 220 provides for photoreactivation of the food product in order to restore organoleptic integrity to the food after the UV treatment in the first, i.e. inactivation, stage 214. Suitable lamps 222 are provided for the photoreactivation as hereinabove described. Means, such as paddles 224 are provided for transporting the food product to and between the different stages 214, 220. A water rinse tank 226 is provided in the reactivation stage 220.

In addition, means 230 for producing and infusing ozone into the immersion tank 212 may also be provided. More particularly, ozone producing lamps 232 may be used to produce ozone which is then infused into the recirculating water, via a Mazzatti ozone injector 236 for example. The Mazzatti injector 236 utilizes a Bernoulli effect to create a vacuum by using a high velocity stream of recirculating water. Reactive ozone then combines with the water, forming a highly volatile hydroxide radical (OH), and hydrogen peroxide, which are effective bacterial sterilants.

A pump 238 may provide means for recirculating the water between the ozone tank 230 and the treatment tank 212. A control console 240 connected to the stages 214, 220, and similar to the console 66 shown in FIG. 1, may also be provided.

In addition, this immersion system 210 may be utilized for eradication and destruction of moth eggs and larvae in the food products. The generation of hydroxyl radicals (OH—), produced by using very high ozone output producing lamps 232, is useful for oxidizing insect larvae present even in the interior of a fruit. It is believed that these reactive oxygen species exhibit a preferential bias for diffusion through a weakened surface fracture in the fruit thereby permitting rapid oxidation of the larvae therein.

Further detail regarding ozone treatment of food products is provided in U.S. Pat. No. 5,405,631, entitled Apparatus and Method for Sanitizing Fruits, which is incorporated herein by this specific reference thereto.

It should also be noted that both the photoregulation and photoreactivation processes have been found to destroy moths and aphids present in and on the food products. It is believed that the photoregulation and photoreactivation processes contribute to breaking "diapause", a period of spontaneous dormancy between periods of activity, in the codling moth at an action spectra of 450 nm. Similarly, the action spectrum for interruption of the scotophase (dark phase) in an aphid is approximately 300 nm to about 450 nm, while the action spectrum for breaking diaphase in the mosquito is 550 nm, suggesting a rhodopsin-type pigment. The photoregulation and photoreactivation stages described hereinabove are believed to interrupt the developmental cycle of the eggs, terminate their growth, and thus inactivate these organisms.

Importantly, the photoreactivation sections of the hereinabove described apparatus are preferably equipped with AC pulsed xenon or high intensity discharge metal halide lamps, or microwave powered electrodeless sulphur lamps as opposed to an infrared source having low efficacy and thus prohibitive exposure time. The preferred photoreactivation lamps, i.e. AC pulsed xenon or high intensity discharge metal halide lamps, provide near infrared radiation at extremely high efficacy for the photoreactivation process. It is noted that "efficacy" is the rate at which a lamp is able to convert electrical power (Watts) into light (Lumens). These sources provide organoleptic integrity to food products that have been subjected to unfiltered DC pulsed xenon, microwave, gamma, or E-beam irradiation. The extent of photorepair to restore organoleptic integrity will be dose dependent for gamma and E-beam processed food products.

It should be appreciated that selective optical glass or fluidic filters may be used in conjunction with each of the lamp arrangements, for example in order to block germicidal wavelengths and to provide narrow band filtration during the photoregulation and photoreactivation processes.

Thermoradiation processing is whereby the amount of radiant energy passed to the food product substrate for microbial inactivation is regulated as a function of the refractive index of the liquid mediums employed, for example dionized water, ethylene glycol, or water soluble dyes of which are used as coolants in the quartz counter current heat exchangers (irradiation modules). These mediums are used as fluidic optical filters that selectively transmit and/or simultaneously inhibit actinic, visible and near infrared wavelengths while cooling the medium pressure mercury arc lamps and the pulsed xenon arc lamps. This prevents $CO_2:O_2$ barrier films commonly used as packaging materials for food products form melting during the inactivation and/or photoreactivation process when food products are irradiated through these packaging materials.

Thermoelectric coolers (not shown) may be used to provide additional cooling at each end of the quartz-counter current heat exchangers. The cooling modules are placed in the center on the exterior of the stainless steel end caps situated at each end of the heat exchanger. This prevents any components adjacent the lamps from melting should water pressure fall.

A furanol film is produced on the surface of food products result of ultraviolet radiation treatment. The furanol film is a by-product of the breakdown of phenolics by reactive oxygen species into intermediate hydroquinoines which are subsequently degraded into furans as a result of ultraviolet radiation. A low pressure water rinse may be used to provide dissolution of the furanol film on the surface of food substrates as applicable prior to, or subsequent to, the photoreactivation process.

Enzymes may be optionally employed to quench residual reactive oxygen species. For example ascorbic acid, glucose oxidase of succinic dehydrogenase.

Although there has been hereinabove described an actinic process and apparatus for cold pasteurization of fresh foods and beverages, in accordance with the present invention for the purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A process for sanitizing food products, the process comprising:

exposing a food product to infrared light in order to inactivate enzymes in the food product responsible for decomposition;

exposing the infrared exposed food product to ultraviolet light at germicidal wavelengths in order to inactivate undesirable microorganisms in the food product, whereby the exposing of the food product to the ultraviolet light causes a reduction in organoleptic qualities of edible portions of the food product; and exposing the ultraviolet exposed food product to near infrared light in order to restore the organoleptic qualities of the ultraviolet exposed food product.

2. The process according to claim 1 wherein the near infrared light is a polychromatic near infrared light having wavelengths of between about 350 nm to about 380 nm in the UVA waveband, about 450 nm in the soret waveband, about 550 nm in the visible waveband and between about 660 nm and about 720 nm in the red waveband.

3. The process according to claim 2 wherein the step of exposing the ultraviolet exposed food product to near infrared light comprises exposing the food product to AC pulsed Xenon lamps.

4. The process according to claim 2 wherein the step of exposing the ultraviolet exposed food product to near infrared light comprises exposing the food product to high intensity discharge metal halide lamps.

5. The process according to claim 1 wherein the ultraviolet light has a wavelength between about 220 nm and about 310 nm.

6. The process according to claim 5 wherein the ultraviolet light has a peak wavelength of about 254 nm.

7. The process according to claim 1 wherein the step of exposing the food product to ultraviolet light includes exposing the food product to UVB light having a wavelength between about 295 nm to about 300 nm in order to cause extinction of ozone.

8. The process according to claim 7 wherein the UVB light has a wavelength of about 298 nm.

9. The process according to claim 1 wherein the step of exposing the food product to ultraviolet radiation causes production of a furanol film on the food product, and wherein the process further comprises the step of dissolving the furanol film by applying a water-based rinse to the food product.

10. The process according to claim 1 wherein the infrared light and near infrared light have wavelengths selected for interrupting a growth cycle of undesireable organisms on a surface and subsurface of the food product.

11. The process according to claim 1 further comprising the step of disposing a film on the food product in order maintain the sanitation thereof, the step of disposing a film including the step of immersing the food product in a polymerizable solution and allowing the solution to polymerize on the food product when the food product is exposed to the infrared light.

12. The process according to claim 11 wherein the polymerizable solution is a polyvinyl-alcohol solution capable of dissolving in water after polymerization.

13. The process according to claim 1 further comprises the step of applying packaging material to the food product before the step of exposing the food product to ultraviolet light and wherein the step of exposing the food product to ultraviolet light includes filtering the light using a fluidic optical filter in order to prevent damage to the packaging material applied to the food product.

14. A process for sanitizing food products, the process comprising:

sanitizing a food product by inactivating undesirable microorganisms in the food product, whereby the sanitizing of the food product causes a reduction in organoleptic qualities of edible portions of the food product; and restoring the organoleptic qualities of the food product by exposing the food product to near infrared light.

15. The process according to claim 14 wherein the step of sanitizing comprises radiating the food product with radiation selected from the group consisting of ultraviolet radiation, E-beam radiation, and gamma radiation at a germicidal wavelengths.

16. The process according to claim 14 wherein the step of sanitizing comprises radiating the food product with ultraviolet light at germicidal wavelengths.

17. The process according to claim 16 wherein the ultraviolet light has a wavelength of between about 220 nm and about 310 nm.

18. The process according to claim 17 wherein the ultraviolet light has a peak wavelength of about 254 nm.

19. The process according to claim 16 wherein the step of exposing the food product to ultraviolet light includes exposing the food product to UVB light having a wavelength between about 295 nm to about 300 nm.

20. The process according to claim 19 wherein the UVB light has a wavelength of about 298 nm.

21. The process according to claim 14 wherein the step of restoring organoleptic qualities comprises the step of exposing the sanitized food product to polychromatic near infrared light having wavelengths of between about 350 nm to about 380 nm in the UVA waveband, about 450 nm in the soret waveband, about 550 nm in the visible waveband, and between about 660 nm and about 720 nm in the red waveband.

22. The process according to claim 16 wherein the step of radiating the food product with ultraviolet light causes production of a furanol film on the food product, and wherein the step of restoring organoleptic qualities to the food product further comprises the step of dissolving the furanol film by applying a water-based rinse to the food product.

* * * * *